US010212035B2

(12) United States Patent
Qiu et al.

(10) Patent No.: US 10,212,035 B2
(45) Date of Patent: Feb. 19, 2019

(54) MESSAGE FLOW MANAGEMENT FOR VIRTUAL NETWORKS

(71) Applicant: AT&T Intellectual Property I, L.P., Atlanta, GA (US)

(72) Inventors: Chaoxin Qiu, Austin, TX (US); Mark A. Ratcliffe, Oakhurst, NJ (US); Robert F. Dailey, Austin, TX (US); Jeffrey L. Scruggs, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 210 days.

(21) Appl. No.: 15/139,544

(22) Filed: Apr. 27, 2016

(65) Prior Publication Data

US 2017/0318087 A1    Nov. 2, 2017

(51) Int. Cl.
| | |
|---|---|
| G06F 15/173 | (2006.01) |
| H04L 12/24 | (2006.01) |
| H04L 29/08 | (2006.01) |
| H04L 29/06 | (2006.01) |
| G06F 9/4401 | (2018.01) |
| G06F 9/455 | (2018.01) |

(52) U.S. Cl.
CPC ............ *H04L 41/082* (2013.01); *G06F 9/442* (2013.01); *G06F 9/45533* (2013.01); *H04L 65/00* (2013.01); *H04L 67/1031* (2013.01)

(58) Field of Classification Search
CPC .................................................. H04L 67/1027
USPC ................................ 709/226, 206, 217, 223
See application file for complete search history.

(56) References Cited

U.S. PATENT DOCUMENTS

| | | | |
|---|---|---|---|
| 8,370,834 B2 | 2/2013 | Edwards et al. | |
| 9,122,713 B2 | 9/2015 | Okamoto | |
| 9,813,379 B1* | 11/2017 | Shevade | ............. H04L 63/0272 |
| 2006/0031852 A1 | 2/2006 | Chu et al. | |
| 2011/0179303 A1* | 7/2011 | Taylor | ..................... G06F 9/485 714/4.11 |
| 2011/0185082 A1 | 7/2011 | Thompson | |
| 2011/0307541 A1 | 12/2011 | Walsh et al. | |

(Continued)

OTHER PUBLICATIONS

ETSI, "Network Functions Virtualisation (NFV); Virtual Network Functions Architecture," Group Specification, Dec. 2014, V1.1.1, ETSI.

*Primary Examiner* — Liang Che A Wang
(74) *Attorney, Agent, or Firm* — Hartman & Citrin LLC

(57) ABSTRACT

Concepts and technologies are disclosed herein for message flow management for virtual networks. A processor can identify a target virtual network function instance that is to be taken offline. The processor can change a status associated with the target virtual network function instance to indicate it being taken offline. The processor can start a graceful shutdown timer to trigger shutdown of the target virtual network function instance. The processor can identify external interfaces and a peer network function that identifies the target virtual network function instance as a next hop. The processor can obtain, for the target virtual network function instance and the peer network function instance, a snapshot that identifies configuration data for the target virtual network function instance and the peer network function instance and can generate a command to trigger a shutdown of the target virtual network function instance.

20 Claims, 6 Drawing Sheets

(56) References Cited

U.S. PATENT DOCUMENTS

| | | |
|---|---|---|
| 2013/0227108 A1 | 8/2013 | Dunbar et al. |
| 2013/0227689 A1* | 8/2013 | Pietrowicz ............... G01R 1/20 726/23 |
| 2013/0346470 A1 | 12/2013 | Obstfeld et al. |
| 2015/0160956 A1 | 6/2015 | Shah et al. |
| 2015/0193251 A1 | 7/2015 | Chu et al. |
| 2015/0237132 A1 | 8/2015 | Antony |
| 2015/0381711 A1 | 12/2015 | Singh et al. |
| 2016/0150393 A1 | 5/2016 | Ratcliffe et al. |
| 2016/0248858 A1 | 8/2016 | Qui et al. |

* cited by examiner

MESSAGE FLOW MANAGEMENT FOR VIRTUAL NETWORKS

BACKGROUND

Over the past several years, virtualization of network resources has been introduced and embraced. According to various embodiments, virtualization can include emulating a hardware/software appliance using virtualized resources. Virtualization can provide flexibility with regard to capacity and functionality, thereby enabling an ability to react and/or address demand shifts, lulls, and/or spikes, as well as an ability to change the functionality associated with the virtualized resources. In particular, virtualization can enable quick creation and scaling of applications as well as quick updates or other changes to the virtualized resources relative to traditional network changes, which has often entailed long lead times and/or downtime to accommodate scale and/or functionality changes.

To update or otherwise change the virtualized resources, however, the virtual network function may be shut down, updated or otherwise changed, and subsequently restarted with the new configuration. Such changes can require defining a step-by-step method of procedures ("MOP") to be used to make these changes on the targeted virtual network function and other interconnecting peers without affecting end-to-end network services. This can consume a great deal of resources and time and therefore can inhibit the ability to update and change virtualized services quickly.

Additionally, as dependence upon cloud services continues to grow, updates and other maintenance may be required more frequently, resulting in increases in downtime and labor to prepare the MOPs mentioned above. Also, there may be a large number of virtual network function instances and a large variety of virtual network functions in a virtualized platform, as well as complex inter-dependency and message routing configurations. Thus, shutdowns of virtual network functions may impact many peer virtual network function instances that can further exacerbate the problems of high cost in terms of downtime, labor, and the like. Still further, given the increasing reliance upon cloud services for realtime and mission-critical services, there is an increased risk and impact of infrastructure level fault and maintenance needs.

SUMMARY

The present disclosure is directed to message flow management for network communication services that can include various virtual and physical network functions. The concepts and technologies described herein can be used to enable dynamic elasticity and can help streamline operations for life cycle events for communication services such as, for example, virtualized communication services that can be implemented on a cloud infrastructure. As used herein, "life cycle events" for a service platform (including virtualized service platforms) can include, but are not limited to, instantiation of network functions (including virtual network functions and physical network functions); upgrades to virtual network functions (e.g., software patches including patches with and without structural changes to the virtual network functions and/or patches that include re-instantiation of virtual network functions); virtual network function scaling (e.g., growth and de-growth such as adding or deleting virtual machines within a node, resizing virtual machines and/or hosts, balancing/re-balancing distribution, adding/removing virtual network function instances, and/or retiring virtual network functions); virtual network function configuration changes (e.g., virtual network function application-level configuration changes and/or virtual network function configuration changes to underlying virtual machines, hosts, layer-2/layer-3 networking, etc.); virtual network function fault recovery (e.g., virtual network function software component level fault and recovery, virtual machine fault and recovery, and virtual function level fault and recovery); backup of virtual network functions; virtualization infrastructure level (e.g., integrated cloud maintenance activities, including host (compute nodes) maintenance, physical network maintenance (e.g., switch and router maintenance), and/or virtualization software maintenance (e.g., maintenance of hypervisors, openstack controller components, etc.)). Thus, it should be understood that "network function" as used herein can include physical network functions and/or instances of virtual network functions.

There are various types of life cycle events that can require a "graceful shutdown" of an existing virtual network function node or virtual network function instance (hereinafter "virtual network function instance") and a subsequent restart of the virtual network function instance with a new configuration, new software image, new or additional capacity or resource allocation, or a different location (e.g., on a different cloud zone, etc.). As used herein, a "graceful shutdown" includes a temporary diversion of application message flows. As will be explained in more detail herein, a method for providing a graceful shutdown can include identifying peers of the virtual network function being shut down; commanding the peers to stop sending new requests to the virtual network function instance to be shut down; allowing messages for existing ongoing service sessions to continue to flow to the virtual network function instance being shut down until a hard "cut-off" timer fires to remove long-duration sessions; and after the virtual network function instance has been restarted and is ready to be put back in service, resuming message flows that were previously blocked.

According to various embodiments, a computing device can execute an application, service, module, or the like, for providing functionality associated with a control module. The control module can be configured to manage message flows associated with network function instances. In particular, a computing environment such as a cloud computing environment can host multiple network function instances of various function types or their components. The network function instances can communicate with one another for various reasons including, but not limited to, providing functionality associated with an application or service, sending data to each other, combinations thereof, or the like. The computing device retrieves or receives configuration information for each virtual network function instance when the virtual network function instance is instantiated and interconnected with other network peers. The computing device can be configured to monitor the computing environment and/or to receive status updates from the computing environment (either by request or without request). Based on the monitoring, a received status, and/or based on requests (e.g., requests entered via a graphical user interface, web portal, application programming interface ("API") or the like), the computing device can determine that a virtual network function instance is to be taken offline for an update, modification, termination, or other reason.

The computing device can change a status of the virtual network function instance to "going offline," "offline," or the like, and start a graceful shutdown timer. The computing device can access network function data and identify, based on the network function data and/or other information such as status updates provided by the computing environment or other entities, external interfaces for the virtual network function instance being taken offline and peer network function instances that send messages or data to the virtual network function instance being taken offline. The computing device can obtain a snapshot of configuration data for the virtual network function instance being taken offline as well as all peer network function instances from which messages flow to the virtual network function instance being taken offline. According to various embodiments, the snapshot can be used to restore message flows after the virtual network function instance that was gracefully shutdown has been restored.

The computing device can determine when or if traffic to the virtual network function instance being shut down has ceased and/or when the graceful shutdown timer expires. When the traffic has ceased and/or the graceful shutdown timer has expired, the computing device can issue commands to take the target virtual network function instance offline. Then the virtual network function instance can be updated, modified, and/or terminated. After modifications to the virtual network function instance taken offline are completed, the virtual network function instance taken offline can be re-activated and message flows for virtual network function that was taken offline and for the peer network function instances can be restored using the configuration data captured by the snapshot. These and other aspects of the concepts and technologies described herein will be illustrated and described in more detail hereinbelow.

According to one aspect of the concepts and technologies disclosed herein, a system is disclosed. The system can include a processor and a memory. The memory can store computer-executable instructions that, when executed by the processor, cause the processor to perform operations. The operations can include identifying a target virtual network function instance that is to be taken offline, the target virtual network function instance including one instance of a virtual network function of two or more virtual network functions that can operate in a cloud computing environment; changing a status associated with the target virtual network function instance to indicate that the target virtual network function instance is being taken offline; starting a graceful shutdown timer that, when expired, triggers shutdown of the target virtual network function instance; identifying, for the target virtual network function instance, external interfaces and a peer network function instances that identify the target virtual network function instance as a next hop; obtaining a snapshot of configuration data for the virtual network function being taken offline and the peer network function instances; and generating a command to trigger a shutdown of the target virtual network function instance.

In some embodiments, the operations further can include monitoring the cloud computing environment. In some embodiments, generating the command can include generating the command in response to a determination that traffic to the target virtual network function instance has ceased. In some embodiments, generating the command can include determining that traffic to the target virtual network function instance has not ceased; waiting for expiration of the graceful shutdown timer; and generating the command in response to detecting expiration of the graceful shutdown timer. In some embodiments, the operations further can include updating the target virtual network function instance; reactivating the virtual network function instance; and loading the state and configuration to the peer network function instance.

In some embodiments, identifying the target virtual network function instance can be based upon a status obtained from the cloud computing environment and network function data that includes data that identifies network function instances, configurations, and next hop information for the network function instances. In some embodiments, the operations further can include detecting instantiation of a new virtual network function instance at the cloud computing environment; obtaining network function information for the new virtual network function instance; and storing the network function information as network function data, the network function data including data that identifies network function instances, configurations, and next hop information for the network function instances. In some embodiments, the operations further can include delivering the command to the cloud computing environment. In some embodiments, the command can be delivered to a domain name system server associated with the cloud computing environment. In some embodiments, the command can be delivered to the target virtual network function instance.

According to another aspect of the concepts and technologies disclosed herein, a method is disclosed. The method can include identifying, at a processor that executes a control module, a target virtual network function instance that is to be taken offline, the target virtual network function instance being one instance of a virtual network function of two or more virtual network functions that can operate in a cloud computing environment; changing, by the processor, a status associated with the target virtual network function instance to indicate that the target virtual network function instance is being taken offline; starting, by the processor, a graceful shutdown timer that, when expired, triggers shutdown of the target virtual network function instance; identifying, by the processor and for the target virtual network function instance, external interfaces and a peer network function instance that identifies the target virtual network function instance as a next hop; obtaining, by the processor, a snapshot for the peer network function instance, the snapshot identifying state and message flow arrangement for the peer network function instance(s); and generating, by the processor, a command to trigger a shutdown of the target virtual network function instance.

In some embodiments, generating the command can include determining that traffic to the target virtual network function instance has not ceased; waiting for expiration of the graceful shutdown timer; and generating the command in response to detecting expiration of the graceful shutdown timer. In some embodiments, the method further can include updating the target virtual network function instance; reactivating the virtual network function instance; and loading the state and configuration to the peer network function instance. In some embodiments, identifying the target virtual network function instance can be based upon a status obtained from the cloud computing environment and network function data that includes data that identifies network function instances, configurations, and next hop information for the network function instances. In some embodiments, the method further can include detecting instantiation of a new virtual network function instance at the cloud computing environment; obtaining network function information for the new virtual network function instance; and storing the network function information as network function data, the network function data including data that identifies network function instances, configurations, and next hop information for the network function instances.

According to yet another aspect, a computer storage medium is disclosed. The computer storage medium can have computer-executable instructions stored thereon that, when executed by a processor, cause the processor to perform operations. The operations can include identifying a target virtual network function instance that is to be taken offline, the target virtual network function instance including one instance of a virtual network function of two or more virtual network functions that can operate in a cloud computing environment; changing a status associated with the target virtual network function instance to indicate that the target virtual network function instance is being taken offline; starting a graceful shutdown timer that, when expired, triggers shutdown of the target virtual network function instance; identifying, for the target virtual network function instance, external interfaces and a peer network function instance that identifies the target virtual network function instance as a next hop; obtaining a snapshot for the target virtual network function and peer network function instance; and generating a command to trigger a shutdown of the target virtual network function instance.

In some embodiments, generating the command can include generating the command in response to a determination that traffic to the target virtual network function instance has ceased. In some embodiments, generating the command can include determining that traffic to the target virtual network function instance has not ceased; waiting for expiration of the graceful shutdown timer; and generating the command in response to a detecting expiration of the graceful shutdown timer. In some embodiments, the operations further can include updating the target virtual network function instance; reactivating the virtual network function instance; and loading the state and configuration to the peer network function instance. In some embodiments, the operations further can include detecting instantiation of a new virtual network function instance at the cloud computing environment; obtaining network function information for the new virtual network function instance; and storing the network function information as network function data, the network function data including data that identifies network function instances, configurations, and next hop information for the network function instances.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
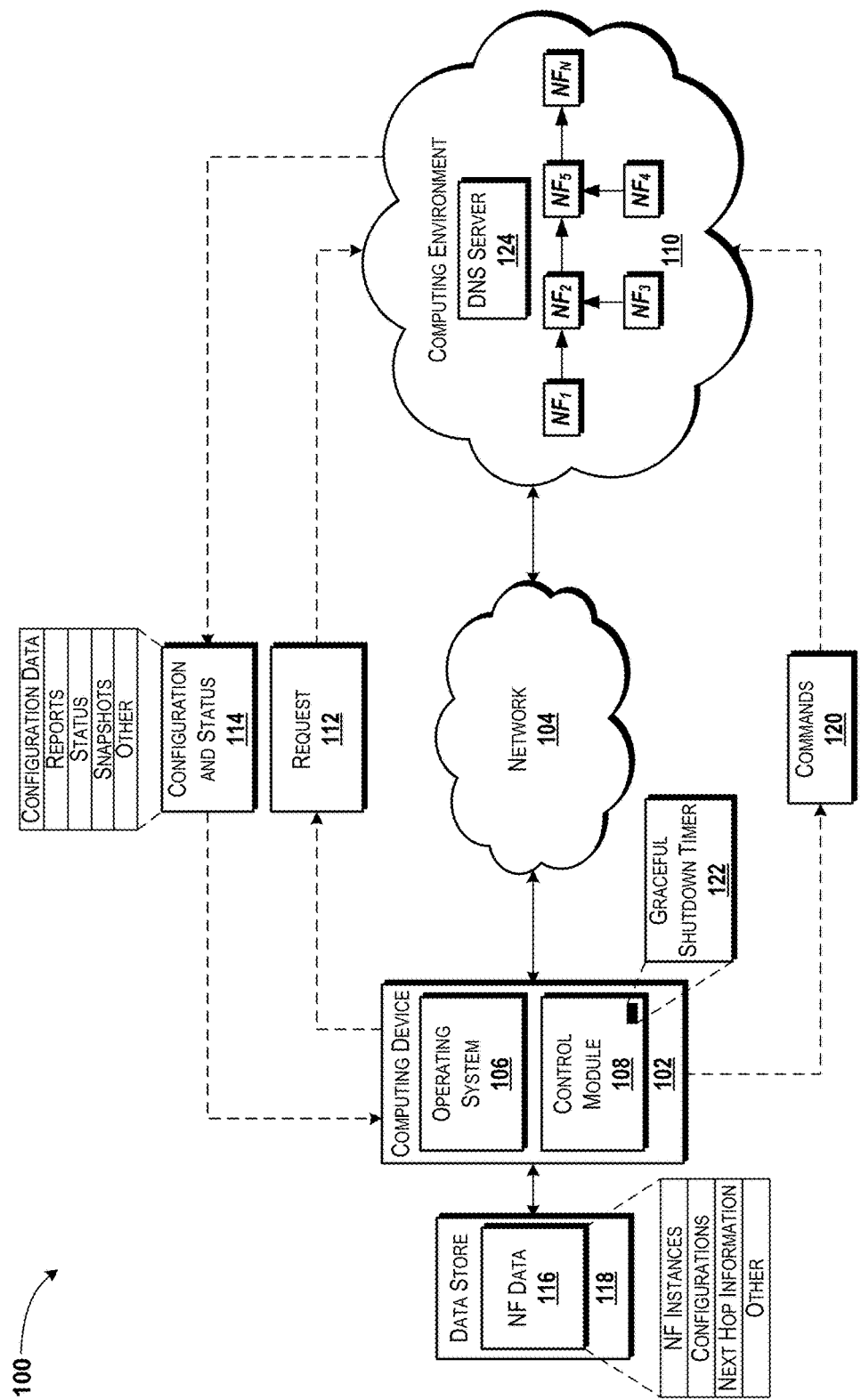
FIG. 1 is a system diagram illustrating an illustrative operating environment for various embodiments of the concepts and technologies described herein.

The following detailed description is directed to message flow management for network functions and/or virtual networks. A computing device can execute an application, service, module, or the like, for providing functionality associated with a control module. The control module can be configured to manage message flows associated with network function instances. In particular, a computing environment such as a cloud computing environment can host multiple instances of various virtual network functions. The network function instances can communicate with one another for various reasons including, but not limited to, providing functionality associated with an application or service, sending data to each other, combinations thereof, or the like. Network function instances may communicate with one another within a same virtual computing environment at a same location or in different virtual computing environments on different locations. The computing device can be configured to monitor the computing environment, and to retrieve or receive configuration information of network function instances pertaining to message flows among peering network function instances, and/or to receive status updates from the computing environment (either by request or without request). Based on the monitoring, a received status, and/or based on requests (e.g., requests entered via a graphical user interface, web portal, application programming interface ("API") or the like), the computing device can determine that a virtual network function instance is to be taken offline for an update, modification, termination, or other reason.

The computing device can change a status of the virtual network function instance to "going offline," "offline," or the like, and start a graceful shutdown timer. The computing device can access network function data and identify, based on the network function data and/or other information such as status updates provided by the computing environment or other entities, external interfaces for the virtual network function instance being taken offline and peer network function instances that send messages or data to the virtual network function instance being taken offline. The computing device can obtain a snapshot of configuration data for the virtual network function instance being taken offline as well as configuration data for the peer network function instances that send data to or receive data from the virtual network function instance being taken offline. The snapshot can be used to restore configurations for the virtual network function instance taken offline and the peer network functions after the graceful shutdown has been completed.

The computing device can determine when or if traffic to the virtual network function instance being shut down has ceased and/or when the graceful shutdown timer expires. When the traffic has ceased and/or the graceful shutdown timer has expired, the computing device can issue commands to take the target virtual network function instance offline. Then the virtual network function instance can be updated, modified, and/or terminated. After modifications to the virtual network function instance taken offline are completed, the virtual network function instance taken offline can be re-activated and the peer network function instances can be reloaded with their configurations and/or states as captured by the snapshot. These and other aspects of the concepts and technologies described herein will be illustrated and described in more detail hereinbelow.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for message flow management for virtual networks will be described, according to an illustrative embodiment. The operating environment 100 shown in FIG. 1 includes a computing device 102. The computing device can operate in communication with and/or as part of a communications network ("network") 104, though this is not necessarily the case.

According to various embodiments, the functionality of the computing device 102 may be provided by one or more server computers, desktop computers, mobile telephones, laptop computers, set-top boxes, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a server computer. It should be understood that this embodiment is illustrative, and should not be construed as being limiting in any way.

The computing device 102 can execute an operating system 106 and one or more application programs such as, for example, a control module 108. The operating system 106 can include a computer program that can be configured to control the operation of the computing device 102. The control module 108 can include an executable program that can be configured to execute on top of the operating system 106 to provide various functions.

According to various embodiments, the control module 108 can be configured to manage message flows for a computing environment 110. According to various embodiments of the concepts and technologies described herein, the computing environment 110 can correspond and/or can include a data center, a server farm, a distributed computing environment such as a cloud computing platform, combinations and/or portions thereof, or the like. It should be understood that the computing environment 110 can include resources located in one or more locations including, but not limited to, one or more distributed computing environments (e.g., multiple cloud platforms in multiple physical locations). The computing environment 110 also can correspond, in some other embodiments, to a single computing device such as a server computer, or the like. In yet other embodiments, the computing environment 110 can correspond to a multi-processor and/or multicore processing system, a disk array, a personal computer, or the like. Thus, the computing environment 110 can correspond to one or more computing devices having one or more data storage devices and/or one or more processing devices. It should be understood that these examples are illustrative and therefore should not be construed as being limiting in any way.

According to various embodiments of the concepts and technologies described herein, the computing environment 110 can include a cloud or distributed computing platform and therefore can include various types of processing, storage, and/or networking resources. For example, the resources can include one or more "nodes," which can be used to refer to a virtual machine or other host that executes or hosts an application function, a control function, a network function, or other functionality. As shown in FIG. 1, the computing environment 110 can host multiple instances (or nodes) of various network function instances (labeled "NF" in FIG. 1). It should be understood that this example is illustrative and therefore should not be construed as being limiting in any way.

The network function instances can collectively provide one or more applications and/or functionality associated with an application. As schematically depicted in FIG. 1 by way of arrows, messages or other data ("data") can flow to, from, through, and/or between one or more of the network function instances. The illustrated flow is illustrative and should not be construed as being limiting in any way. As shown in the example embodiment of FIG. 1, data can flow from a first network function instance $NF_1$ to a second network function instance $NF_2$; data can flow from a third network function instance $NF_3$ to the second network function instance $NF_2$; data can flow from the second network function instance $NF_2$ to a fifth network function instance $NF_5$; data can flow from a fourth network function instance $NF_4$ to the fifth network function instance $NF_5$; and data can flow from the fifth network function instance $NF_5$ to an nth network function instance $NF_n$. It should be understood that this example is illustrative and therefore should not be construed as being limiting in any way.

It can be appreciated from the illustrated example data flow that some network function instances may receive data from multiple network function instances while some other network function instances may receive data from a single (or even no) network function instance. Similarly, some network function instances may feed data to multiple network function instances while other network function instances may feed data to single (or even no) network function instances. Additionally, it should be understood that although not separately illustrated in FIG. 1, some of the network function instances may correspond to single instances of multiple redundant network function instances. As such, data may flow to, from, through, and/or between multiple instances of network function instances in some embodiments.

According to various embodiments of the concepts and technologies described herein, the control module 108 can be configured to manage message flows (as depicted by the data flows shown in FIG. 1) for the computing environment 110 and/or the network function instances associated therewith. For example, the control module 108 may be configured to manage message flows for a particular virtual network function instance that is to be updated, scaled, or otherwise modified. As explained above, such a modification may require a graceful shutdown of the virtual network function instance. By way of example, the control module 108 may be used to update the fifth network function instance $NF_5$, which in this example can be a virtual network function instance. As can be appreciated with reference to FIG. 1, the fifth network function instance $NF_5$ can receive data (e.g., messages) from the second network function instance $NF_2$ and the fourth network function instance $NF_4$, and can feed data to the nth network function instance $NF_n$. If the fifth network function instance $NF_5$ is to be shut down, these and/or other message flows may be managed by the control module 108.

To manage the message flows, the control module 108 can be configured to monitor the computing environment 110. In some embodiments, the control module 108 can be configured to receive reports from other devices or entities relating to monitoring of the computing environment 110. In some other embodiments, the control module 108 can be configured to request, from the computing environment 110 and/or other devices or entities, information relating to monitoring of the computing environment 110. In the illustrated embodiment, the control module 108 can be configured to generate a request for status and configuration data (hereinafter "request") 112.

The request 112 can request various types of status information and configuration information. For example, the request 112 can request operation information associated with the computing environment 110 such as load, capacities, utilizations, resource health, demand and/or demand changes, combinations thereof, or the like associated with the computing environment 110 and/or network function instances operating thereon; snapshots that can define various aspects of the computing environment 110 and/or network function instances operating thereon; and/or other status information such as next hop information, configuration data, or the like. The request 112 also can request configuration data from all instances of virtual network functions. As used herein, "configuration data" can include configuration in each virtual network function instance including external interfaces and peer nodes associated with the virtual network function instance, and the like.

Figure 2:
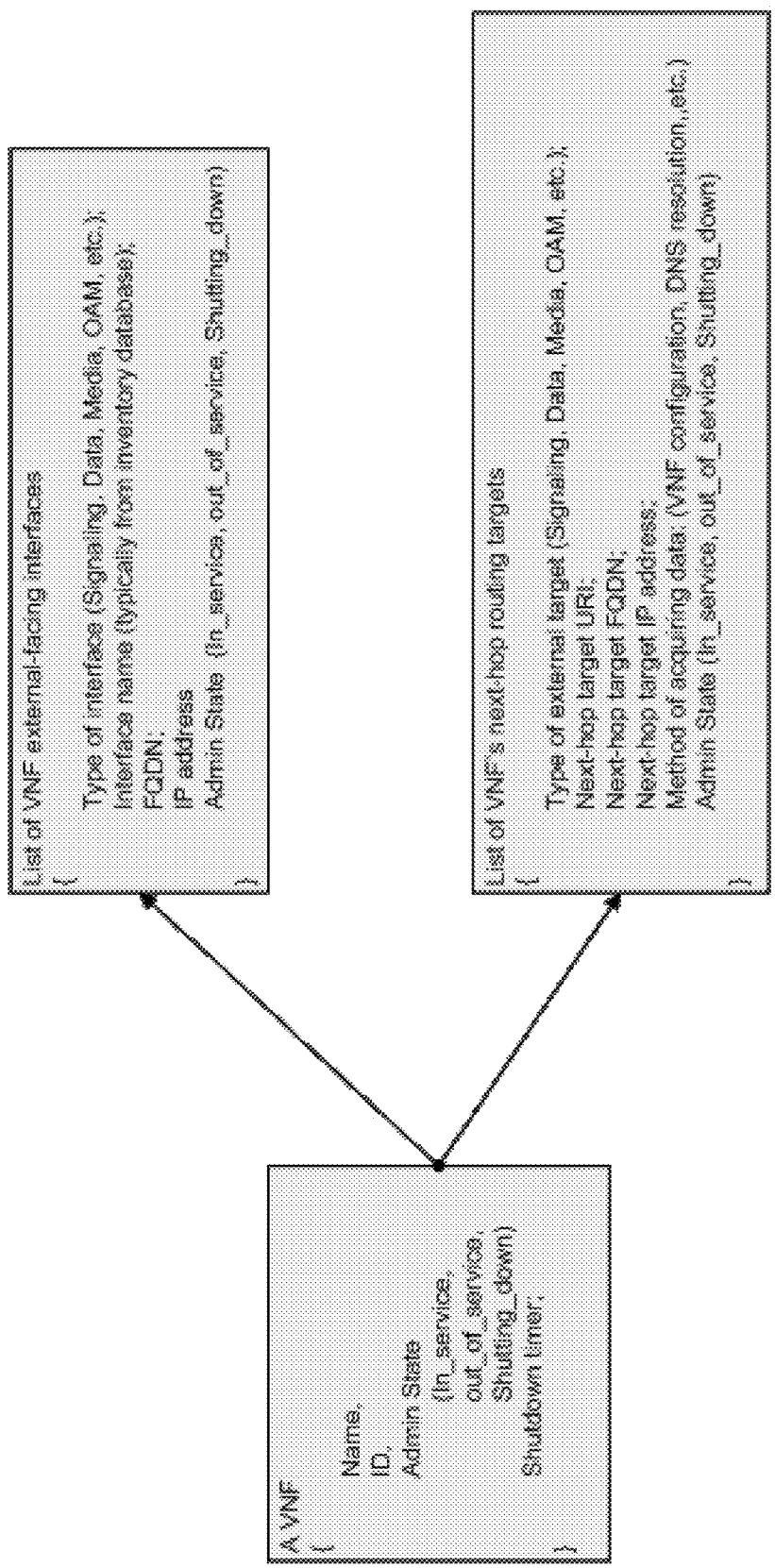
FIG. 2 is a line diagram that schematically illustrates a data schema for identifying peer network function instances and changing configurations of virtual network function instances and peer network function instances, according to an example embodiment of the concepts and technologies described herein.

According to various embodiments of the concepts and technologies described herein, when a virtual network function instance is being shut down, the external interfaces for that virtual network function instance can be examined to identify all peer network function instances that exchange data with (e.g., send data to or receive data from) the virtual network function instance being taken offline. Once these peer network function instances are identified, the peer network function instances can also be examined to determine how those peer network function instances are configured to send messages to the interface (shared with the virtual network function instance being taken offline). Thus, for example, a virtual network function instance being taken offline may send data to and/or receive data from a peer network function instance. That peer network function instance, meanwhile, may send data not only to the virtual network function instance being taken offline, but also other network function instances. In this case, the configuration of the virtual network function instance being taken offline may be changed to cease messaging to the peer network function instance, and the peer network function instance configuration may be changed to case sending data to the virtual network function instance being taken offline. The configuration of the peer network function instance to send data to other network function instances, however, may be unchanged. An example of a data schema depicting one example embodiment of the operations described in this paragraph is shown in FIG. 2.

In response to the request 112, the control module 108 (or the computing device 102 that hosts the control module 108) can receive or otherwise obtain a status message or other communication that can include status information, reports, snapshots of configuration data, and other information (hereinafter "configuration and status") 114. Based on the above description of the request 112, it should be understood that the configuration and status 114 can include, but is not limited to, data that can indicate load, capacities, utilizations, resource health, demand and/or demand changes, combinations thereof, or the like associated with the computing environment 110 and/or network function instances operating thereon; data that can define various aspects of the computing environment 110 and/or network function instances operating thereon; configuration data for network function instances; other information such as next hop information, or the like associated with the computing environment 110 and/or network function instances operating thereon. Because the configuration and status 114 can include additional and/or alternative information, it should be understood that these examples are illustrative and therefore should not be construed as being limiting in any way.

The control module 108 can analyze the configuration and status 114 and determine, based upon the configuration and status 114, one or more virtual network function instances that are to be taken offline. In some other embodiments, the control module 108 may determine that a particular virtual network function instance is to be taken offline in response to other communications such as a service request (not shown in FIG. 1). The service request can request a modification to a virtual network function instance such as, for example, a modification to the virtual network function instance, a scaling of the virtual network function instance, combinations thereof, or the like. Thus, the control module 108 can be configured to determine, based upon various types of information, that a virtual network function instance is to be taken offline (e.g., to execute a graceful shutdown as defined herein).

In some embodiments, the control module 108 can be configured to access network function data 116. The network function data 116 can define various aspects of the network function instances operating in the computing environment 110 and can be collected and/or updated when virtual network function instances are instantiated, updated, created, terminated, or otherwise changed. For example, the network function data 116 can include data that identifies network function instances (virtual network function instances and/or physical network function instances), configurations, next hop information, combinations thereof, or the like. The network function data 116 also can include other types of information such as, for example, data that identifies message flows among and/or between various network function instances, capacities associated with the network function instances, demands associated with the network function instances, combinations thereof, or the like. Because the network function data 116 can include other information as illustrated and described herein, it should be understood that these examples are illustrative and therefore should not be construed as being limiting in any way.

In various embodiments, the network function data 116 can be stored in a data storage device associated with the computing device 102 such as a mass storage device, a memory, or the like. In some other embodiments, the network function data 116 can be stored in a data storage device that is external to the computing device 102. In the illustrated embodiment, the network function data 116 can be stored in a data store 118. The functionality of the data store 118 can be provided by one or more unitary or distributed databases, one or more server computers, one or more data storage devices, other computing systems, and the like. According to various embodiments, the data store 118 can store a database or other data structure (e.g., including the network function data 116) that can contain all collected configuration data and state information for all network function instances in a virtual computing environment (e.g., including the configuration data for the target virtual network function being taken offline and the peer network function instances that send data to or receive data from the virtual network function being taken offline). As noted above, the peer network function instances can be embodied as physical network function instances or virtual network function instances. Thus, as used in the claims, a "network function" can include a physical network function and/or a virtual network function unless modified by either "virtual" or "physical."

The control module 108 can identify the virtual network function instance that is to be taken offline and issue one or more commands 120. The commands 120 can include computer-executable instructions that, when executed by a processor (e.g., a processor associated with the computing environment 110), cause the processor to change the status associated with the virtual network function instance being taken offline. In some other embodiments, the control module 108 can change the status of the virtual network function instance without generating a command 120 to effect that change. The status of the virtual network function instance can be changed to "shutting down," "offline," or the like.

The control module 108 also can be configured to start a graceful shutdown timer 122. The graceful shutdown timer 122 can include a timer job that, when expired, causes the control module 108 to take the virtual network function instance offline. Thus, the control module 108 can be configured to start the graceful shutdown timer 122 and/or monitor the graceful shutdown timer 122 for expiration. The graceful shutdown timer 122 also can be configured to generate a notification or alert when a time associated with the graceful shutdown timer 122 ends or terminates. It should be understood that this example is illustrative and therefore should not be construed as being limiting in any way.

The control module 108 also can identify interfaces for the virtual network function instance being taken offline. This identification can be based upon the network function data 116 or other information. As noted above, the network function data 116 can include next hop information, configuration information, message flow information, and the like. Thus, the control module 108 can be configured to identify any external interface for the virtual network function instance that is being shut down. In some embodiments, the control module 108 can search the network function data 116 to identify any peer network function instance that is configured to target as a next hop an interface of the virtual network function instance being taken offline. The control module 108 also can determine if the configuration that specifies the interface as a next hop is set in the peer network function instance, in a domain name system ("DNS") server 124, or elsewhere.

The control module 108 can generate a snapshot of configuration data for the virtual network function being taken offline and for each peer network function instance that targets the virtual network function instance being taken offline, as configurations of these peer network function instances will be temporarily changed to enable taking the virtual network function instance offline as illustrated and described herein. As explained above, the snapshot can be used to restore message flows after a graceful shutdown is complete. The control module 108 can generate commands 120. The commands 120 can include a command 120 directed to each of the network function instances that targets an interface associated with the virtual network function instance being taken offline. The commands 120 can instruct the network function instances to stop sending messages or other requests to the virtual network function instance being taken offline. In some embodiments, the control module 108 sends the commands 120 to the network function instances, while in some other embodiments, the control module 108 can send the commands 120 to the DNS server 124. It should be understood that these examples are illustrative and therefore should not be construed as being limiting in any way.

In some embodiments, the control module 108 can generate a report for each of the changed network function instances. The report can indicate methods of change (e.g., on a virtual network function instance or via the DNS server 124). It should be understood that this example is illustrative and therefore should not be construed as being limiting in any way. Once the target virtual network function instance (the virtual network function instance being taken offline) sees no application traffic arriving at the target virtual network function instance, or once the graceful shutdown time expires, the target virtual network function instance can be taken offline. It should be understood that this example is illustrative and therefore should not be construed as being limiting in any way.

After the traffic to a virtual network function instance has ceased and/or the graceful shutdown timer 122 has expired, the target virtual network function instance can be updated, modified, and/or terminated. After modifications to the virtual network function instance taken offline are completed, the virtual network function instance taken offline and the peer network function instances can be re-activated and/or reconfigured to reestablish the messaging flows that existed before the graceful shutdown was initiated. These and other aspects of the concepts and technologies described herein will be illustrated and described in more detail hereinbelow.

The control module 108 also can be configured to create the network function data 116 illustrated and described herein. For example, the control module 108 can be configured to register new network function instances, to collect next hop information, and/or to collect configurations for one or more new or existing network function instances associated with the computing environment 110.

In some embodiments, the control module 108 can be configured to detect instantiation of a new virtual network function instance. The instantiation of the new virtual network function instance can occur in various ways, as will be explained in more detail hereinbelow with reference to FIG. 4. At any rate, the control module 108 can detect instantiation of the new virtual network function instance and store network function information (as the network function data 116) associated with the new virtual network function instance. The network function information can include, but is not limited to, a list of external interfaces of the new virtual network function instance, configuration data such as next hop information, message routing, and the like associated with the new virtual network function instance, combinations thereof, or the like. In some embodiments, the control module 108 can request the information from the new virtual network function instance or other entities. It should be understood that this example is illustrative and therefore should not be construed as being limiting in any way.

The control module 108 can store the network function information as the network function data 116. In some embodiments, the control module 108 can be configured to generate a report that includes the network function information (e.g., next hop information, configuration, and/or message flow information associated with the virtual network function instance) and send the report to another entity, which can be configured to store the report (and/or message routing information extracted from the report) as the network function data 116. These and other aspects of the control module 108 will be illustrated and described in more detail below.

FIG. 1 illustrates a single computing device 102, a single network 104, a single computing environment 110, and a single data store 118. It should be understood, however, that various implementations of the operating environment 100 can include zero, one, or more than one computing device 102; zero, one, or more than one network 104; zero, one, or more than one computing environment 110; and/or zero, one, or more than one data store 118. As such, the illustrated embodiment should be understood as being illustrative, and should not be construed as being limiting in any way.

Figure 3:
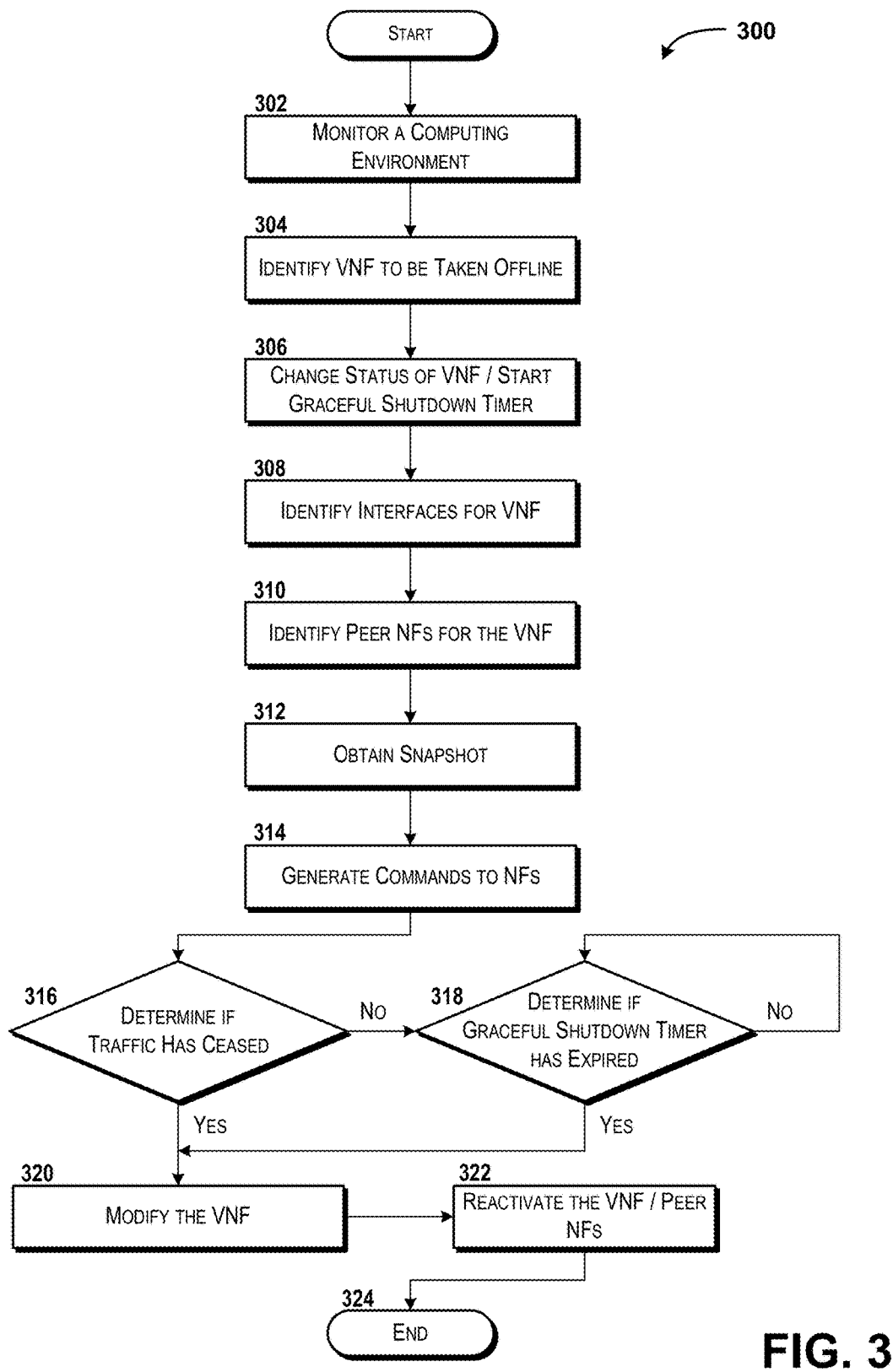
FIG. 3 is a flow diagram showing aspects of a method for managing a message flow for a virtual network function instance, according to an illustrative embodiment of the concepts and technologies described herein.

Turning now to FIG. 3, aspects of a method 300 for managing a message flow for a virtual network function instance will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, to perform one or more operations and/or causing the processor to direct other components of the computing system or device to perform one or more of the operations.

For purposes of illustrating and describing the concepts of the present disclosure, the methods disclosed herein are described as being performed by the computing device 102 via execution of one or more software modules such as, for example, the control module 108. It should be understood that additional and/or alternative devices and/or network nodes can provide the functionality described herein via execution of one or more modules, applications, and/or other software including, but not limited to, the control module 108. Thus, the illustrated embodiments are illustrative, and should not be viewed as being limiting in any way.

The method 300 begins at operation 302. At operation 302, the computing device 102 can monitor a computing environment or network. In some embodiments, for example, the computing device 102 can monitor the computing environment 110 illustrated and described herein with reference to FIG. 1. As explained above with reference to FIG. 1, the computing device 102 can be configured to directly monitor the computing environment 110, in some embodiments. In some other embodiments, the computing device 102 can be configured to request and/or receive status and/or monitoring information from the computing environment 110. According to various embodiments, the status and/or other monitoring information can be provided to the computing device 102 by the computing environment 110, by other devices or entities, or the like. It should be understood that this example is illustrative and therefore should not be construed as being limiting in any way.

In some embodiments, the functionality of operation 302 for monitoring the computing environment 110 can be removed from the method 300 and/or substituted with an operation for receiving a request that entails taking a virtual network function instance offline. The request can include, for example, a request to upgrade a virtual network function instance, a request to terminate a virtual network function instance, or other requests that explicitly or implicitly require or request taking a virtual network function instance offline. In some embodiments, for example, a user interface, web portal, application programming interface ("API") or other interface associated with the computing device 102 can receive an indication of a particular virtual network function instance that is to be taken offline. Because a request to take a virtual network function instance offline can be received in a number of manners, it should be understood that these examples are illustrative and therefore should not be construed as being limiting in any way.

From operation 302, the method 300 can proceed to operation 304. At operation 304, the computing device 102 can identify a virtual network function instance that is to be taken offline. As noted above, the virtual network function instance can be identified, in some embodiments, by a request that can be received in lieu of (and/or in addition to) monitoring the network in operation 302. In some other embodiments, the virtual network function instance that is to be taken offline can be explicitly identified (e.g., via a graphical user interface, an API, a portal, an explicit request, or the like), while in some other embodiments the virtual network function instance that is to be taken offline can be identified by the computing device 102 based on an analysis of network function data 116 and/or configuration and status 114, which can be received as part of operation 302 in some embodiments. Regardless of how the virtual network function instance is identified, the computing device 102 can identify that a particular virtual network function instance is to be taken offline in operation 304.

From operation 304, the method 300 can proceed to operation 306. At operation 306, the computing device 102 can change a status associated with the virtual network function instance that is to be taken offline and start a graceful shutdown timer 122. In particular, the computing device 102 can set a status associated with the virtual network function instance that is being shut down ("target virtual network function instance") to "shutting down," "going offline," or some other status that can indicate that the virtual network function instance is being taken out of operation. The computing device 102 also can start a graceful shutdown timer 122.

As explained above, the graceful shutdown timer 122 can specify a time period that, when expired, triggers shutdown of the virtual network function instance. Thus, the graceful shutdown timer 122 can correspond to an override for the message routing functionality illustrated and described herein since, at the end of the timer, the virtual network function instance can be taken offline even if all message routing to the virtual network function instance has not yet ceased, as will be more clearly understood with reference to the remaining description of the method 300. The timer can be set to any value from one or more portions of a microsecond to a number of minutes, hours, or even days. The length of the graceful shutdown timer 122 can be set by various entities and/or by one or more configurations, preferences, settings, or the like associated with the control module 108. It should be understood that this example is illustrative and therefore should not be construed as being limiting in any way.

From operation 306, the method 300 can proceed to operation 308. At operation 308, the computing device 102 can identify interfaces associated with the virtual network function instance that is being taken offline. According to various embodiments, the computing device 102 can identify each external interface for the target virtual network function instance. These external interfaces can be identified, in some embodiments, by the computing device 102 querying or analyzing the network function data 116 for any external interface that is associated with the target virtual network function instance. It should be understood that this example is illustrative and therefore should not be construed as being limiting in any way.

From operation 308, the method 300 can proceed to operation 310. At operation 310, the computing device 102 can identify peer network function instances for (or associated with) the target virtual network function instance. Again, the computing device 102 can be configured to identify the one or more peer network function instances by querying and/or analyzing the network function data 116. These peer network function instances can be identified as any virtual network function instance that specifies the target virtual network function instance as a next hop in any configuration associated with the virtual network function instance. Thus, with reference to FIG. 1, the computing device 102 could identify the first network function instance $NF_1$ and the second network function instance $NF_2$ as peer network function instances for the third network function instance $NF_3$ (which in this example could be a virtual network function instance). It should be understood that this example is illustrative and therefore should not be construed as being limiting in any way. It can be appreciated that in some embodiments, DNS resolution records may be updated to remove from domain name record resolutions any impacted IP address of external interfaces of virtual network function instances being shut down. It should be understood that this example is illustrative and therefore should not be construed as being limiting in any way.

From operation 310, the method 300 can proceed to operation 312. At operation 312, the computing device 102 can obtain a snapshot of configuration data for the virtual network function instance being taken offline and the peer network function instances that communicate with the virtual network function instance being taken offline. In some embodiments, the computing device 102 can generate (or receive) the snapshot as part of the configuration and status 114 illustrated and described herein with reference to FIG. 1. The snapshot can capture configuration information and/or state associated with each virtual network function instance identified as a peer network function instance for the target virtual network function instance in operation 310, as well as the target virtual network function instance itself. Thus, the snapshot can capture configuration data for all of the network function instances involved or affected by the graceful shutdown. This snapshot can be used to restore message flows between the virtual network function instance and the peer network function instances after these configurations are temporarily changed to accommodate the graceful shutdown. The snapshot can be used after the graceful shutdown ends (e.g., when the target virtual network function instance is restarted or replaced) so the message flows associated with the peer network function instances can be returned to their previous states. It should be understood that this example is illustrative and therefore should not be construed as being limiting in any way.

From operation 312, the method 300 can proceed to operation 314. At operation 314, the computing device 102 can generate one or more commands for the network function instances to effect taking the virtual network function instance offline. Thus, in operation 314, the computing device 102 can create one or more commands such as the commands 120 illustrated and described herein with reference to FIG. 1. Thus, the commands generated in operation 314 can include commands to the target virtual network function instance to take the target virtual network function instance offline, commands to the peer network function instances not to send messages or other data to the target virtual network function instance, or other commands. As such, the commands 120 generated in operation 314 can cause the target virtual network function instance to go offline, the peer network function instances to continue holding or rerouting messages directed to the target virtual network function instance, and/or other commands 120. As noted above, the commands 120 can be sent to the network function instances, the DNS server 124, and/or other entities. It should be understood that this example is illustrative and therefore should not be construed as being limiting in any way.

From operation 314, the method 300 can proceed to operation 316. At operation 316, the computing device 102 can determine if traffic to the target virtual network function instance has ceased. Thus, in operation 316, the computing device 102 can determine if any messages are being routed to the target virtual network function instance and/or if message routing to the target virtual network function instance has ceased.

If the computing device 102 determines in operation 316 that traffic to the target virtual network function instance has not ceased, the method 300 can proceed to operation 318. At operation 318, the computing device 102 can determine if the graceful shutdown timer 122 has expired. Thus, although not separately illustrated in FIG. 3, it should be understood that the computing device 102 can be configured to monitor the graceful shutdown timer 122 and/or to receive an alert or notification from the graceful shutdown timer 122 when a time limit associated with the graceful shutdown timer 122 expires. If the computing device 102 determines, in operation 318, that the graceful shutdown timer 122 has not expired, the method 300 can pause or repeat operation 318. Thus, execution of the method 300 can, but does not necessarily, pause at operation 318 until the computing device 102 determines, in any iteration of operation 318, that the graceful shutdown timer 122 has expired (or receives a notification or alert that the graceful shutdown timer 122 has expired).

If the computing device 102 determines, in any iteration of operation 318, that the graceful shutdown timer 122 has expired, the method 300 can proceed to operation 320. The method 300 can also proceed to operation 320 from operation 316 if the computing device 102 determines that traffic to the target virtual network function instance has ceased.

At operation 320, the computing device 102 can modify the target virtual network function instance identified in operation 304. Thus, the computing device 102 can update the virtual network function instance, terminate the virtual network function instance, or take other actions with respect to the virtual network function instance as illustrated and described herein. It should be understood that in some embodiments, the target virtual network function instance can be updated by other devices or entities instead of the computing device 102. As such, it should be understood that the illustrated embodiment is illustrative and should not be construed as being limiting in any way.

From operation 320, the method 300 can proceed to operation 322. At operation 322 the computing device 102 can reactivate the target virtual network function instance identified in operation 302 and/or instantiate a new virtual network function instance that is replacing the target virtual network function instance. The computing device also can re-activate and/or re-instantiate the peer network function instances taken offline by the commands generated in operation 314 and/or reestablish the configurations of the peer network function instances and/or target virtual network function instance using the snapshots. In particular, in various embodiments, the computing device 102 can use the snapshot illustrated and described herein to reload configuration data for the target virtual network function instance and the peer network function instances so these network function instances will again communicate with one another as before the graceful shutdown. It should be understood that this example is illustrative and therefore should not be construed as being limiting in any way.

From operation 322, the method 300 can proceed to operation 324. The method 300 can end at operation 324. Although the method 300 illustrates the graceful shutdown occurring when either messages to the target virtual network function instance cease or when the graceful shutdown timer expires, it should be understood that in various embodiments an override may exist to prevent the graceful shutdown from occurring even if the messages have ceased and/or if the graceful shutdown timer has expired. For example, in some cases there may be special treatment on expiry of the graceful shutdown timer such as, for example, alert operations, alarms, confirmation requests (e.g., confirmation to continue, to restart the graceful shutdown timer, etc.), or other actions to suspend the graceful shutdown. It should be understood that these examples are illustrative and therefore should not be construed as being limiting in any way.

Figure 4:
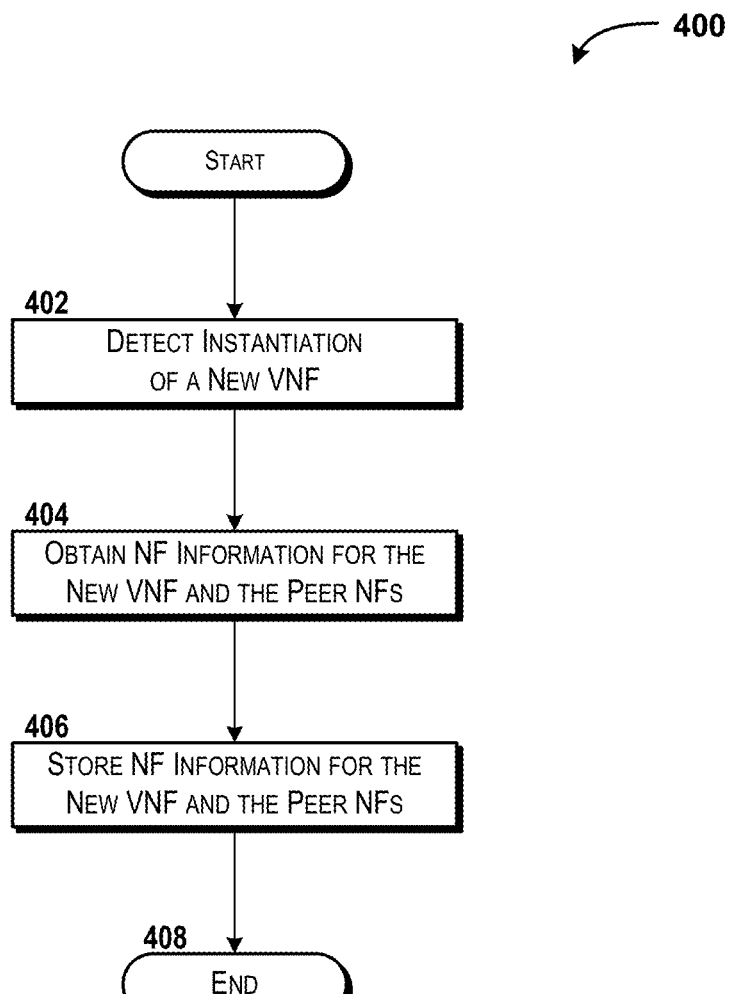
FIG. 4 is a flow diagram showing aspects of a method for creating or updating the network function data, according to an illustrative embodiment of the concepts and technologies described herein.

Turning now to FIG. 4, aspects of a method 400 for creating or updating network function data will be described, according to an illustrative embodiment. The method 400 begins at operation 402. At operation 402, the computing device 102 can detect instantiation of a new virtual network function instance. In some embodiments, the new virtual network function instance can be instantiated by an orchestrator or other device (not illustrated in the FIGURES) and the computing device 102 can detect instantiation of the virtual network function instance by receiving a notification of the instantiation of the new virtual network function instance, by detecting the new virtual network function instance by analyzing the configuration and status 114 provided by the computing environment 110, and/or otherwise determine that the new virtual network function instance has been instantiated.

In some other embodiments, a network inventory subsystem may receive configuration information for the new virtual network function instance and the network inventory subsystem can notify the computing device 102 of the new virtual network function instance. In some other embodiments, a collection agent associated with the control module 108 and/or the computing device 102 can detect the new virtual network function instance and report addition of the new virtual network function instance. Regardless of how the computing device 102 detects instantiation of the new virtual network function instance, the new virtual network function instance can be detected and a registration process can be performed to update the network function data 116 to reflect the new virtual network function instance as illustrated and described herein.

From operation 402, the method 400 can proceed to operation 404. At operation 404, the computing device 102 can obtain network function information associated with the new virtual network function instance and any peer network function instances that communicate with (e.g., send data to or receive data from) the new virtual network function instance. Operation 404 therefore can include capturing various types of information associated with the new virtual network function instance and the peer network function instances including, but not limited to, a list of external interfaces associated with the new virtual network function instance and the peer network function instances (which can include fully qualified domain names ("FQDNs") and IP addresses) and configuration data for the new virtual network function instance and the peer network function instances (including configuration information that reflects next hop information and message routing information for the new virtual network function instance and the peer network function instances). The network function information can be provided to the computing device 102 via a report or other formats.

From operation 404, the method 400 can proceed to operation 406. At operation 406, the computing device 102 can store the network function information as the network function data 116. In operation 406, the computing device 102 can store routing associated with the new virtual network function instance and the peer network function instances as the network function data 116. As part of operation 406, the computing device 102 can update the network function data 116 to reflect a complete list of next hop routing targets with an FQDN or IP address associated with the new virtual network function instance and the peer network function instances. Thus, future queries for the new virtual network function instance and the peer network function instances (e.g., to execute a graceful shutdown for the new virtual network function instance or one of the peer network function instances as illustrated and described above with reference to FIG. 3) can include a query of the network function data 116 for network function instances that include the new virtual network function instance and the peer network function instances as a target for a next hop. It should be understood that this example is illustrative and therefore should not be construed as being limiting in any way.

From operation 406, the method 400 can proceed to operation 408. The method 400 can end at operation 408.

Figure 5:
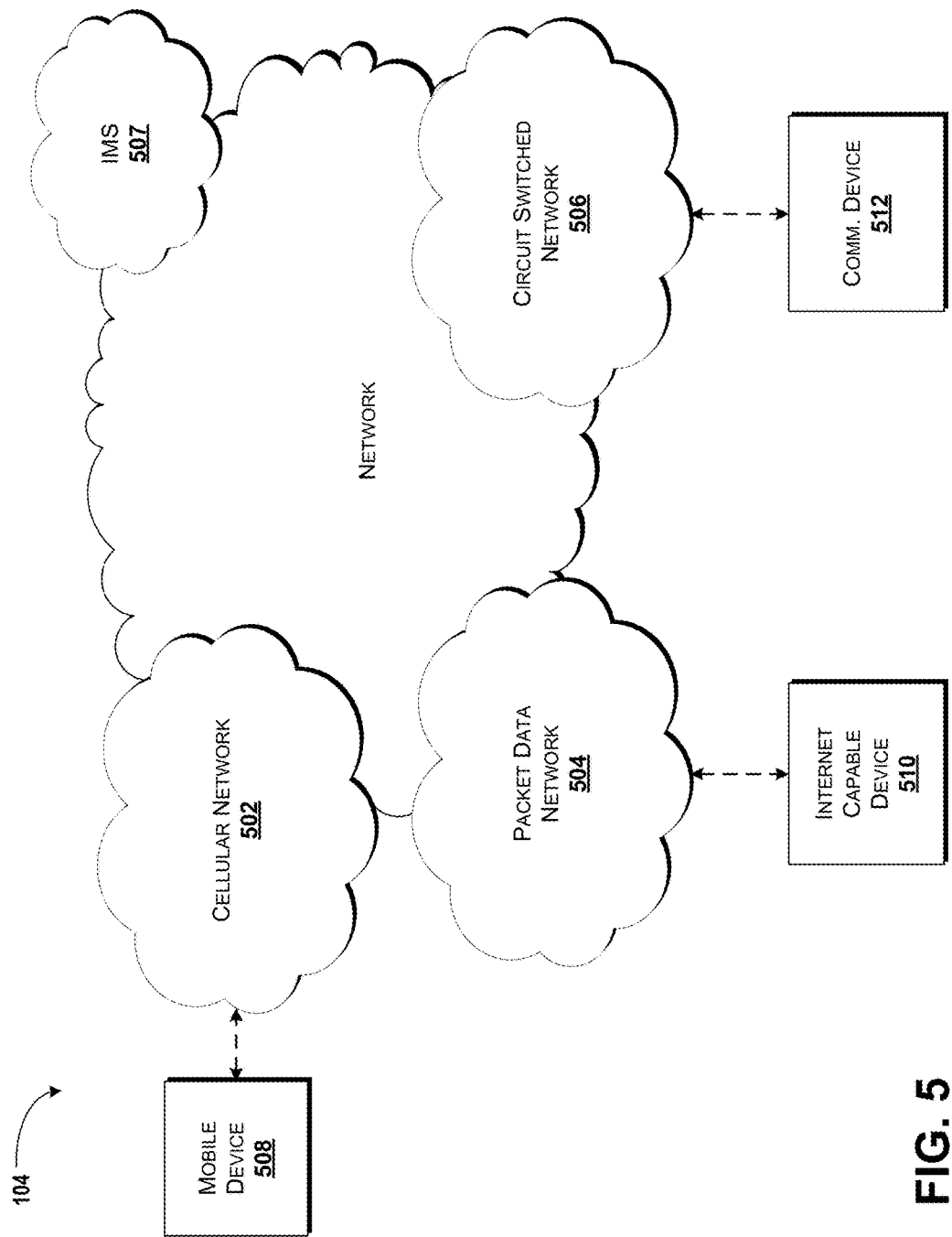
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS") 507, and the like. The cellular network 502 also includes radios and nodes for receiving and transmitting voice, data, and combinations thereof to and from radio transceivers, networks, the packet data network 504, and the circuit switched network 506. The IMS 507 can be used to support session-oriented services (e.g., voice, video, combinations thereof, or the like) using IP transport. Some services that are supported by the IMS 507 include, but are not limited to, voice over LTE ("VoLTE"), AT&T Consumer Voice over IP ("CVoIP"), and the like. Because the IMS 507 can support many other types of services, it should be understood that these examples are illustrative and therefore should not be construed as being limiting in any way.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSDPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

Figure 6:
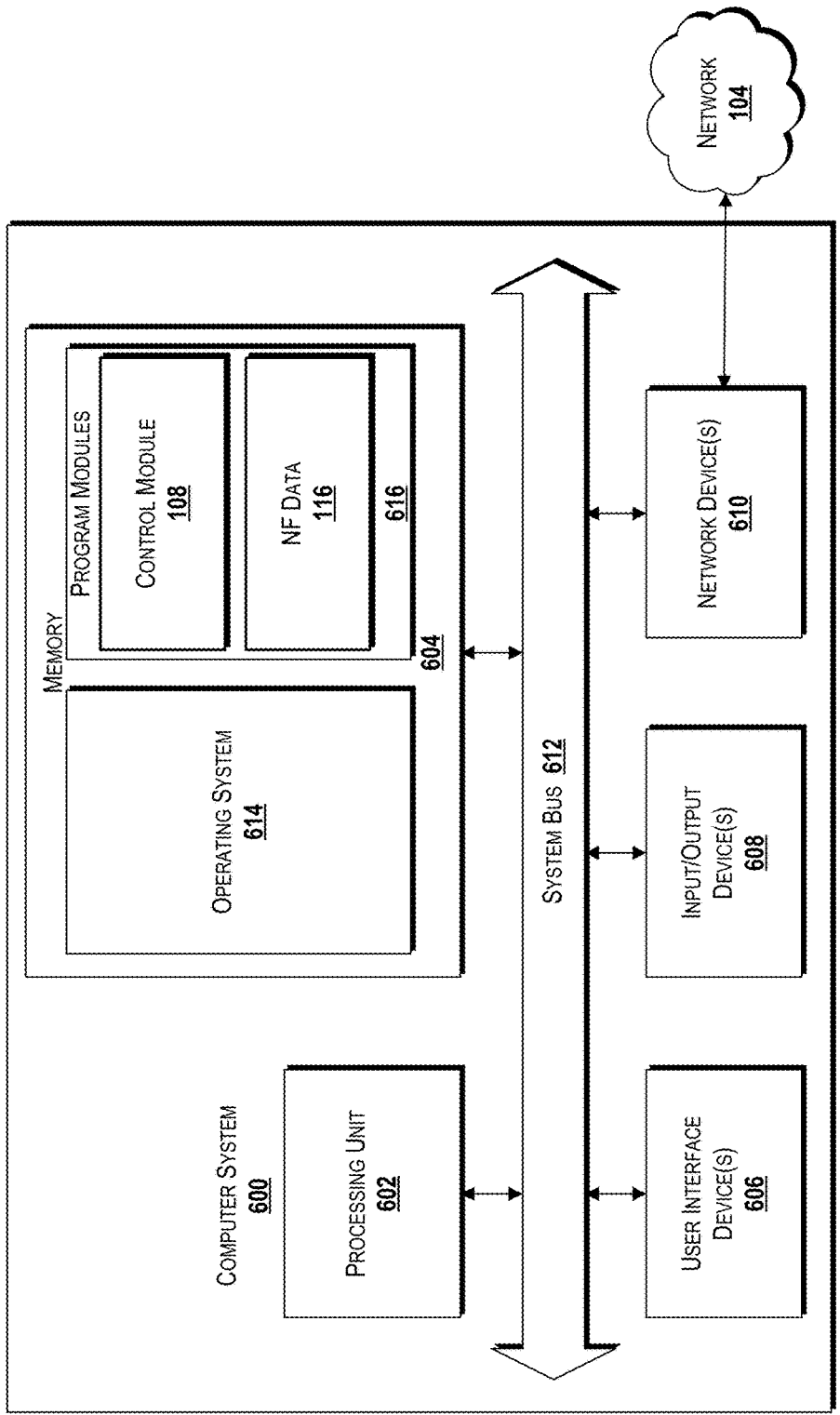
FIG. 6 is a block diagram illustrating an example computer system configured to manage message flow for virtual networks, according to some illustrative embodiments of the concepts and technologies described herein.

FIG. 6 is a block diagram illustrating a computer system 600 configured to provide the functionality described herein for message flow management for virtual networks, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the control module 108. This and/or other programs can be embodied in computer-readable media as computer-executable instructions that, when executed by the processing unit 602, perform one or more of the methods 300, 400 described in detail above with respect to FIGS. 3-4. According to embodiments, the program modules 616 may be embodied in hardware, software, firmware, or any combination thereof. Although not shown in FIG. 6, it should be understood that the memory 604 also can be configured to store the virtual network function instances, the status request 112, the configuration and status 114, the network function data 116, the commands 120, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for message flow management for virtual networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A system comprising:
   a processor; and
   a memory that stores computer-executable instructions that, when executed by the processor, cause the processor to perform operations comprising
      identifying, in a cloud computing environment, a target virtual network function instance that is to be taken offline,
      changing a status associated with the target virtual network function instance to indicate that the target virtual network function instance is being taken offline,
      starting a timer that, when expired, triggers a shutdown of the target virtual network function instance, identifying, for the target virtual network function instance, a peer network function instance that sends messages to the target virtual network function instance, obtaining a snapshot for the target virtual network function instance and the peer network function instance, wherein the snapshot identifies configuration data for the target virtual network function instance and the peer network function instance, determining if messages to the target virtual network function instance have ceased, in response to determining that the messages to the target virtual network function instance have ceased, generating a command to trigger the shutdown of the target virtual network function instance, in response to determining that the messages to the target virtual network function instance have not ceased, determining if the timer has expired, and in response to detecting expiration of the timer, generating the command to trigger the shutdown of the target virtual network function instance.

2. The system of claim 1, wherein the computer-executable instructions, when executed by the processor, cause the processor to perform operations further comprising:
monitoring the cloud computing environment.

3. The system of claim 1, wherein identifying the target virtual network function instance comprises determining that the target virtual network function instance is to be taken offline to be updated.

4. The system of claim 1, wherein the computer-executable instructions, when executed by the processor, cause the processor to perform operations further comprising:
updating the target virtual network function instance;
reactivating the target virtual network function instance; and
loading the configuration represented by the snapshot to the target virtual network function instance and the peer network function instance to restore a flow of the messages.

5. The system of claim 4, wherein updating the target virtual network function instance comprises scaling the target virtual network function instance.

6. The system of claim 1, wherein identifying the target virtual network function instance is based upon the status obtained from the cloud computing environment and network function data that comprises data that identifies network function instances, configurations, and next hop information for the network function instances.

7. The system of claim 1, wherein the computer-executable instructions, when executed by the processor, cause the processor to perform operations further comprising:
detecting instantiation of a new virtual network function instance at the cloud computing environment;
obtaining network function information for the new virtual network function instance and for peer network function instances that communicate with the new virtual network function instance; and
storing the network function information as network function data, the network function data comprising data that identifies network function instances, configurations, and next hop information for the network function instances.

8. The system of claim 1, wherein the computer-executable instructions, when executed by the processor, cause the processor to perform operations further comprising:
delivering the command to the cloud computing environment.

9. The system of claim 8, wherein the command is delivered to a domain name system server associated with the cloud computing environment.

10. The system of claim 8, wherein the command is delivered to the target virtual network function instance.

11. A method comprising:
identifying, at a processor that executes a control module, a target virtual network function instance that is to be taken offline, wherein the target virtual network function instance operates in a cloud computing environment;

changing, by the processor, a status associated with the target virtual network function instance to indicate that the target virtual network function instance is being taken offline;

starting, by the processor, a timer that, when expired, triggers a shutdown of the target virtual network function instance;

identifying, by the processor and for the target virtual network function instance, a peer network function instance that sends messages to the target virtual network function instance;

obtaining, by the processor, a snapshot for the target virtual network function instance and the peer network function instance, wherein the snapshot identifies configuration data for the target virtual network function instance and the peer network function instance;

determining, by the processor, if messages to the target virtual network function instance have ceased;

in response to determining that the messages to the target virtual network function instance have ceased, generating, by the processor, a command to trigger the shutdown of the target virtual network function instance;

in response to determining that the messages to the target virtual network function instance have not ceased, determining, by the processor, if the timer has expired; and in response to detecting expiration of the timer, generating, by the processor, the command to trigger the shutdown of the target virtual network function instance.

12. The method of claim 11, wherein identifying the target virtual network function instance comprises determining that the target virtual network function instance is to be taken offline to be updated.

13. The method of claim 11, further comprising:
updating the target virtual network function instance;
reactivating the target virtual network function instance; and
loading the configuration represented by the snapshot to the target virtual network function instance and the peer network function instance to restore a flow of the messages.

14. The method of claim 11, wherein identifying the target virtual network function instance is based upon the status obtained from the cloud computing environment and network function data that comprises data that identifies network function instances, configurations, and next hop information for the network function instances.

15. The method of claim 11, further comprising:
detecting instantiation of a new virtual network function instance at the cloud computing environment;
obtaining network function information for the new virtual network function instance and for peer network function instances that communicate with the new virtual network function instance; and storing the network function information as network function data, the network function data comprising data that identifies network function instances, configurations, and next hop information for the network function instances.

16. A computer storage medium having computer-executable instructions stored thereon that, when executed by a processor, cause the processor to perform operations comprising:
    identifying, in a cloud computing environment, a target virtual network function instance that is to be taken offline;
    changing a status associated with the target virtual network function instance to indicate that the target virtual network function instance is being taken offline;
    starting a timer that, when expired, triggers a shutdown of the target virtual network function instance;
    identifying, for the target virtual network function instance, a peer network function instance that sends messages to the target virtual network function instance;
    obtaining a snapshot for the target virtual network function instance and the peer network function instance, wherein the snapshot identifies configuration data for the target virtual network function instance and the peer network function instance;
    determining if messages to the target virtual network function instance have ceased;
    in response to determining that the messages to the target virtual network function instance have ceased, generating a command to trigger the shutdown of the target virtual network function instance;
    in response to determining that the messages to the target virtual network function instance have not ceased, determining if the timer has expired; and
    in response to detecting expiration of the timer, generating the command to trigger the shutdown of the target virtual network function instance.

17. The computer storage medium of claim 16, wherein identifying the target virtual network function instance comprises determining that the target virtual network function instance is to be taken offline to be updated.

18. The computer storage medium of claim 16, wherein the computer-executable instructions, when executed by the processor, cause the processor to perform operations further comprising:
    updating the target virtual network function instance;
    reactivating the target virtual network function instance; and
    loading the configuration represented by the snapshot to the target virtual network function instance and the peer network function instance to restore a flow of the messages.

19. The computer storage medium of claim 18, wherein updating the target virtual network function instance comprises scaling the target virtual network function instance.

20. The computer storage medium of claim 16, wherein the computer-executable instructions, when executed by the processor, cause the processor to perform operations further comprising:
    detecting instantiation of a new virtual network function instance at the cloud computing environment;
    obtaining network function information for the new virtual network function instance and for peer network function instances that communicate with the new virtual network function instance; and
    storing the network function information as network function data, the network function data comprising data that identifies network function instances, configurations, and next hop information for the network function instances.

* * * * *